Patented Jan. 23, 1934

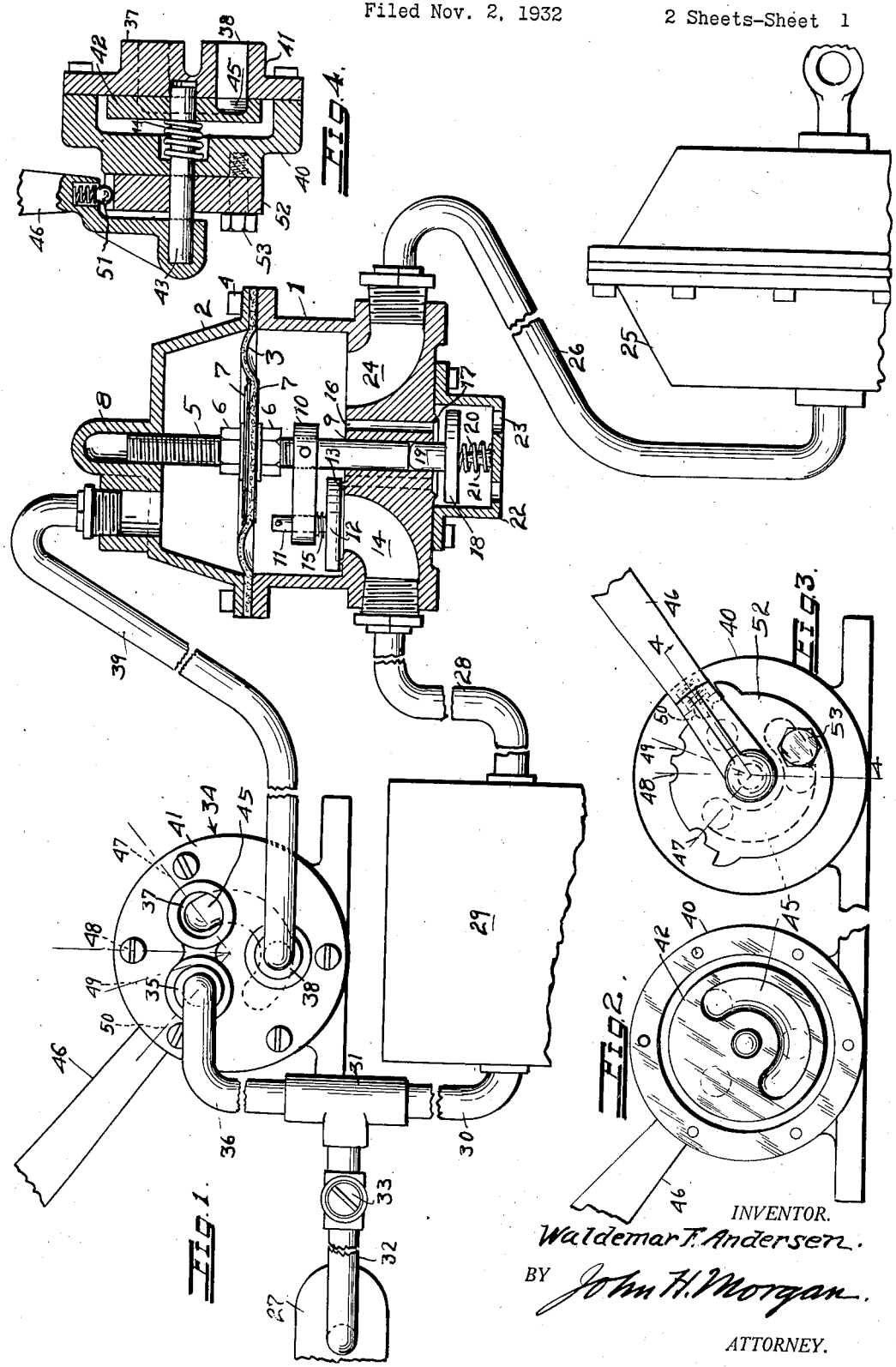

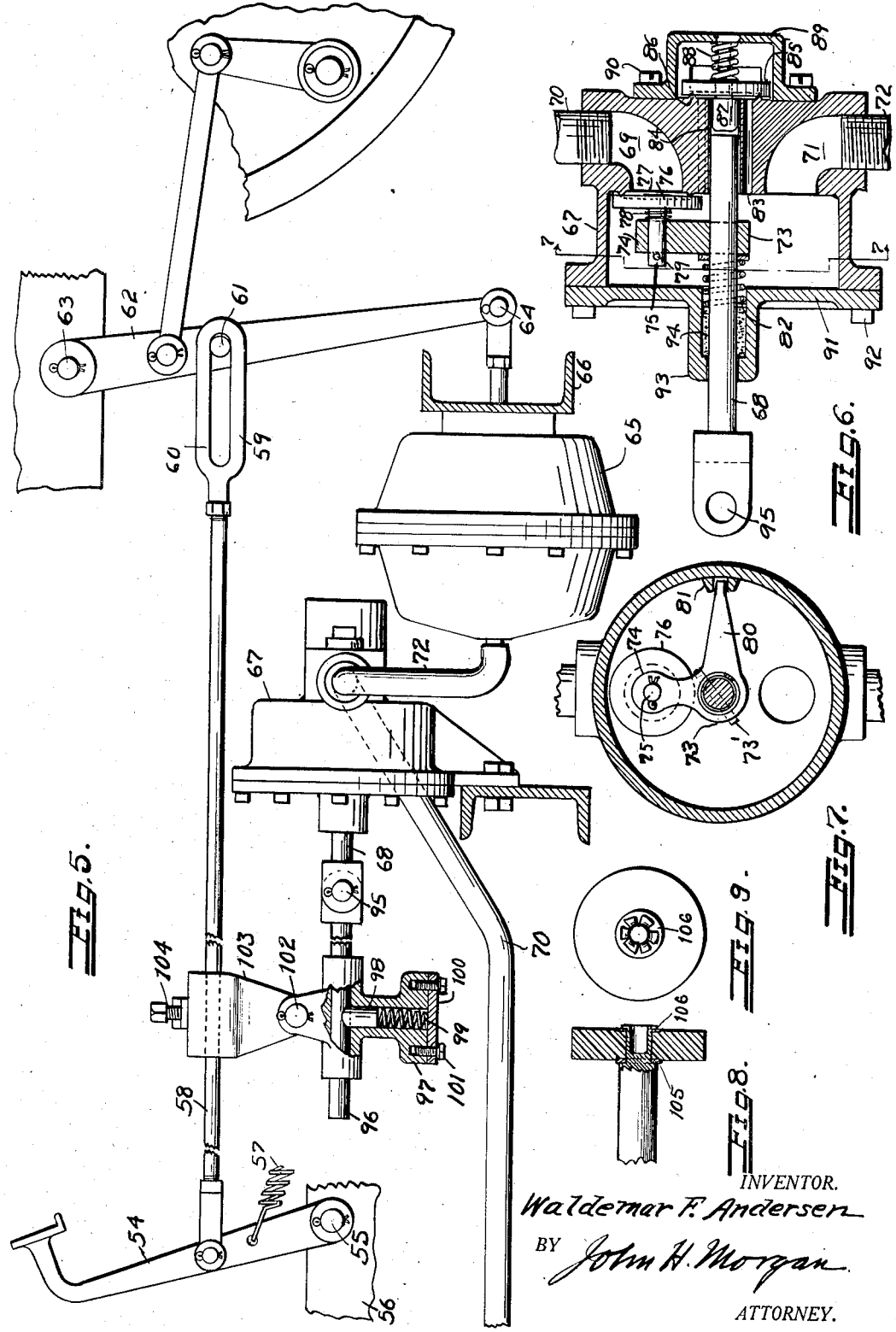

1,944,485

UNITED STATES PATENT OFFICE

1,944,485

AIR CONTROL MECHANISM

Waldemar F. Andersen, Alameda, Calif., assignor to Dudley F. Searle, Oakland, Calif.

Application November 2, 1932. Serial No. 640,775

5 Claims. (Cl. 303—54)

This invention relates to improvements in air control mechanism of the class adapted to control the operation of vacuum power as it is applied to various machines, but more particularly this invention relates to the control valves and the means for operating them.

The principle object of my invention is to provide valves for controlling the amount of vacuum at the power chambers and means for holding any suitable number of inches of vacuum until ready to release the power.

Another object is to provide valves that have a resilient face contact without metal backing, that is a rubber disc supported at the center only, in contrast to the usual poppet valve which is made of metal, or has a metal backing of stiff material, and thus a valve is had in which there are no sliding metal to metal contacts so that wear is reduced and also the danger of the valves sticking caused by dust particles getting under the valve, the flexibility of the disc allowing the particles to blow through.

Another object is to provide separate valves for the intake and the exhaust ports, and means to close one valve before opening the other.

Another object is the application of these valves to remote control of vacuum power, such as the braking system of trailers of motor vehicles, the valves being operated by a diaphragm having a vacuum connection each side thereof, controlled by a hand valve adjacent the driver.

Another object of the invention is the provision of means to use these valves to control the vacuum power of auxiliary braking means applied to the standard foot pedal brake of motor vehicles.

Other objects will appear to those skilled in the art as the description progresses.

An embodiment of the invention is shown in the accompanying drawings in which the same reference numeral is applied to the same portion throughout the several views and of which there may be modifications.

Figure 1 is a partly sectional and partly diagrammatic view showing the application of the invention in the remote control braking system of motor vehicle-trailers.

Figure 2 is a view showing the hand control valve having the connection plate removed.

Figure 3 is a view of the control valve looking from the handle side.

Figure 4 is a sectional view of the control valve on line 4—4 of Fig. 3.

Figure 5 is a partly sectional and partly diagrammatic view of the application of the valves to the vacuum brake operating means as connected to the foot pedal brake of motor vehicles.

Figure 6 is a sectional view of the control valve body in which are mounted the operating valves.

Figure 7 is a section taken on line 7—7 of Figure 6.

Figure 8 is a detail view of the disc valve partly in section.

Figure 9 is a face view of the valve.

The numeral 1 indicates the remote control valve body lower portion, and 2 the upper portion thereof. A diaphragm 3 is held between the portions by screws 4. A rod 5 is secured to the diaphragm by the nuts 6. Washers 7 are provided to stiffen the diaphragm. The rod is loosely mounted in the hole 8 in the upper portion, and in the lower portion, the rod slides in the hole 9 which extends through the bottom.

Fixed to the rod in any suitable way is the laterally projecting bracket 10, in this instance the bracket is fixed on the rod by a pin 73′. This bracket carries the vertically slidable pin 11 on the lower end of the pin is fixed the valve disc 12. This valve is made preferably of soft rubber and is adapted to be seated on the raised ring having a pointed top edge as shown at 13, preferably concentric with the hole leading to the power vacuum port 14.

A spring 15 is provided, the purpose of which will be explained presently. There are a plurality of holes 16 around the hole 9, and they are surrounded by the raised pointed ring 17 on which a rubber disc valve 18 is adapted to be seated.

A loosely fitting pin 19 is secured to the valve and projects into the hole 9. A spring 20 acts to hold the valve against its seat, the spring being held in place by the pin 21 on the cap 22. Holes 23 are provided to let accumulations of dust drop out. When the rod 5 is raised by the diaphragm the bracket 10 raises, but the spring 15 keeps the valve 12 seated until the valve 18 is closed, and when the rod 5 is lowered, the valve 12 will be closed before the rod contacts the pin 19 on the valve 18, and raises it from its seat, so that both valves are always closed before either one is opened.

A chamber port 24 is connected to the power vacuum chamber 25 by the tube 26. The power chamber is connected to the braking system in the well known way.

The port 14 is connected to the intake manifold 27 through the tube 28, the reserve storage tank 29, the tube 30, the T 31 and the tube 32.

A check 33 is provided to hold the reserve vacuum in the tank.

A hand control valve 34 is mounted in the cab convenient to the driver, while the remote control valve is mounted on the trailer with the power chamber and reserve tank.

The valve body has the port 35 connected to the intake manifold 27 by means of the tube 36, T 31, and tube 32.

37 is an open port to the atmosphere.

38 is a port connected to the upper chamber 2 by the tube 39.

The hand valve body comprises the main portion 40, the connecting plate 41, a rotatable disc 42, a pin 43 on which the disc is pressed, a spring 44 to keep the disc surface tight against the face of the member 41 to cover the ports 35—37 and 38.

A depressed port 45 adapted to connect the ports when turned to register therewith. The disc is turned by the handle 46 which is forced on the end of the pin 43. Notches 47—48—49 and 50 are provided in which a spring pressed ball 51 is engaged to hold the handle at the different positions. The notches are transverse grooves so as to allow for the longitudinal movement of the handle, as controlled by the spring 44.

The portion that has the notches is a separate piece of harder metal 52 and is held in its adjusted position by the bolt 53. Another reason for having the notches on a separate piece is that the notches can be set to open the ports at the exact right amount, and then the hole is drilled for the bolt 53.

In the application of the valve arrangement to the vacuum power auxiliary to the standard foot brake as shown in Figures 5—6 and 7, 54 indicates a brake pedal pivoted at 55 on a portion of the vehicle frame 56. A spring 57 acts to pull the pedal back after it has been pressed forward. Pivoted to the pedal is the brake rod 58. At the other end of the rod is the slip clevis 59 having the slot 60 which engages the pin 61 on the lever 62, the lever being pivoted to the frame at 63.

At the lower end of the lever connection is made to the rod 64 extending into the power chamber 65 which is attached to a suitable cross member 66 of the vehicle.

The control valve 67 is similar in construction to the remote control valve above described, the difference being that the rod 68 which operates the valves is acted on directly instead of being operated by a diaphragm. The body of the valve has the port 69 connected by a tube 70 to the intake manifold of the engine.

On the opposite side there is a chamber port 71 connected to the power chamber by a tube 72.

On the rod 68 is the bracket 73 which has a lateral 74 which carries the slidable pin 75 that has the rubber disc valve 76 secured thereto, and this valve covers the port 69. 77 is a raised ring having a thin top edge. 78 is a spring, and 79 a cotter pin.

On the bracket 73 is a guide arm 80 adapted to slide in a guideway 81. A spring 82 acts principally to retain the packing around the rod 68. A plurality of holes 83 in the bottom of the chamber around the hole 84 in which the rod is slidable is covered by the rubber disc valve 85 on the raised ring having the sharp edge 86.

The pin 87 projects into the hole and is adapted to be contacted by the end of the rod 68 to raise it from its seat, and the valve is normally held closed by the spring 88 in the cap 89 which is secured to the body by the screws 90. A cover plate 91 is secured by the screws 92 and it has the bearing 93 in which there is a suitable packing ring 94 to keep out the dust.

Connected by the pivot members at 95 is the rod 96, and mounted on this rod is the friction retarding bracket 97 in which is a friction block 98 of suitable material like fibre is held against the rod 96 by the spring 99 held in place by the plate 100, and the screws 101. The bracket is pivoted at 102 to clamp member 103 adapted to be clamped to the brake rod 58 and held by suitable screws 104. The rod 96 may be connected direct to the foot pedal by means of suitable connections. The disc valve is put on the pin against a shoulder having a washer 105 between it and the disc, and there is a washer 106 over which the pin is riveted.

In the operation of the remote control valve, the brakes being off, the hand control lever is set in notch 50, and the port 45 connects the port 38 and the open port 37. The valve 12 is closed, and the valve 18 is open. Now if it is desired to retard the trailer to some extent, the lever is thrown to the notch 48, and in this position the port 45 connects the port 38 to the port 35, but the opening to port 35 is only partly open. Now valve 18 is closed and valve 12 is raised a little, and this allows a short vacuum in the power chamber.

If it is desired to hold this vacuum, the hand lever is moved back to the notch 49 which closes the port and retains the amount of vacuum. When the lever is thrown over to notch 47, the port 35 is wide open and the brakes are set, the valve 12 being raised to the full extent.

When the vacuum is turned off the rod 5 drops down and the valve 12 closes the port 14, the spring 15 allowing the rod to continue until it contacts the pin 19 and raises the valve 18, which allows the air to fill the vacuum in the power chamber. It will be noted that the valve 18 will close before valve 12 opens.

In operation of the foot power brake, the first movement of the pedal carries forward the rod 96 and rod 68 closing valve 85 and opening valve 76, which allows the air to be drawn from the power chamber through the tubes 70 and 72, the friction bracket allowing the brake rod to be carried still further forward after the valves are open and when the pedal is released, the spring 57 returns the rod to the original position, the bracket sliding on the rod 96.

It will be seen from the above description that a valve arrangement has been evolved that has no sliding contacts to cause wear or sticking, as dust will not effect the operation of the resilient disc valves.

Having thus described my invention, what I desire to secure by Letters Patent of the United States is as follows, but modifications may be had in carrying out the invention as shown in the drawings, and in the particularly described form thereof within the purview of the annexed claims.

1. An air control mechanism of the class described comprising a valve body having an upper and a lower compartment, a flexible diaphragm between said compartments, a rod fixed to said diaphragm, guides for said rod, a bracket fixed to said rod, a slidable pin in said bracket, a flat resilient disc valve on said pin, a valve seat for said valve having a pointed edge, a spring acting to hold said valve on its seat while the rod continues to travel, a flat resilient valve on the outside of said valve body having a pin in axial relation with said rod, a seat for said valve having a pointed edge, a spring to close said valve, ports adapted to be closed by said valve, and means to vary the air pressure on each side of said diaphragm to operate said valves.

2. An air control mechanism of the class described comprising a valve body having an upper and a lower compartment, a flexible diaphragm between said compartments, a port in the lower compartment adapted to be connected to a source of vacuum power, a valve seat having a raised edge around said port, a flexible disc valve for said seat, a pin fixed to the center of said disc, a rod fixed to said diaphragm having guiding holes in the upper and lower compartments, a bracket on said rod in the lower compartment, in which said pin is loosely mounted, a spring between said bracket and said valve, means to limit the movement of said pin, a port in the lower compartment adapted to be connected to vacuum power chamber, atmosphere ports in said lower chamber, a flexible disc valve adapted to close said ports, a spring adapted to close said valve, a short pin fixed to the center of said disc valve adapted to be contacted by said rod to open said valve and a port in the upper chamber connected to a source of vacuum power.

3. An air control mechanism of the class described comprising a valve body having a rod adapted to be reciprocated, a bracket fixed to said rod, a guide for said bracket, a port adapted to be connected to a source of vacuum power, a valve seat having a raised sharp edge around said port on the inside of said valve body, a flexible disc valve for said seat, a pin fixed to the center of said disc and adapted to reciprocate in said bracket, a spring between said disc and said bracket, means to limit the movement of said pin, ports leading to the atmosphere in said valve body, a valve seat having a raised sharp edge around said ports, a flexible disc valve for said seat, a pin fixed to said disc and adapted to be engaged by said rod, a spring to hold said valve closed.

4. An air control mechanism of the class described comprising a valve body having a valve operating rod adapted to be reciprocated in said body, a bracket fixed to said rod, a guide for said bracket, a port adapted to be connected to a source of vacuum power, a valve seat having a raised sharp edge around said port on the inside of said valve body, a flexible disc valve for said seat, a pin fixed to the center of said disc and adapted to reciprocate in said bracket, a spring between said disc and said bracket, means to limit the movement of said pin, ports leading to the atmosphere in said body, a valve seat having a raised sharp edge around said ports, a flexible disc valve for said seat, a pin fixed to said disc and adapted to be engaged by said rod to open said valve, a spring to close said valve, a connecting rod pivoted to said rod, a friction bracket on said connecting rod, a clamp pivoted to said bracket and adapted to be clamped to a brake rod of a vehicle brake system.

5. An air control mechanism of the class described comprising a valve body having an upper and lower compartment, a diaphragm separating said compartments, a valve operating rod fixed to said diaphragm, guides for said rod, a side projecting bracket on said rod, a port adapted to be connected to a source of vacuum power, a valve seat having a raised sharp edge around said port inside said lower compartment, a flexible disc valve for said seat, a pin fixed to said disc and adapted to reciprocate in said bracket, a spring between said bracket and said disc, means to limit the movement of said pin, a port in said lower compartment adapted to be connected to a power chamber, ports connecting said lower chamber with the atmosphere, a raised valve seat around said ports on the outside of said lower chamber, a valve of flexible material for said seat, a pin fixed to said valve in axial alignment with said valve rod and adapted to be contacted thereby to open said valve, a port in the upper chamber adapted to be connected to a source of vacuum power, and means to control the amount of vacuum above and below said diaphragm.

WALDEMAR F. ANDERSEN.